(No Model.)
H. ROESKE.
FILTER.
No. 357,505. Patented Feb. 8, 1887.
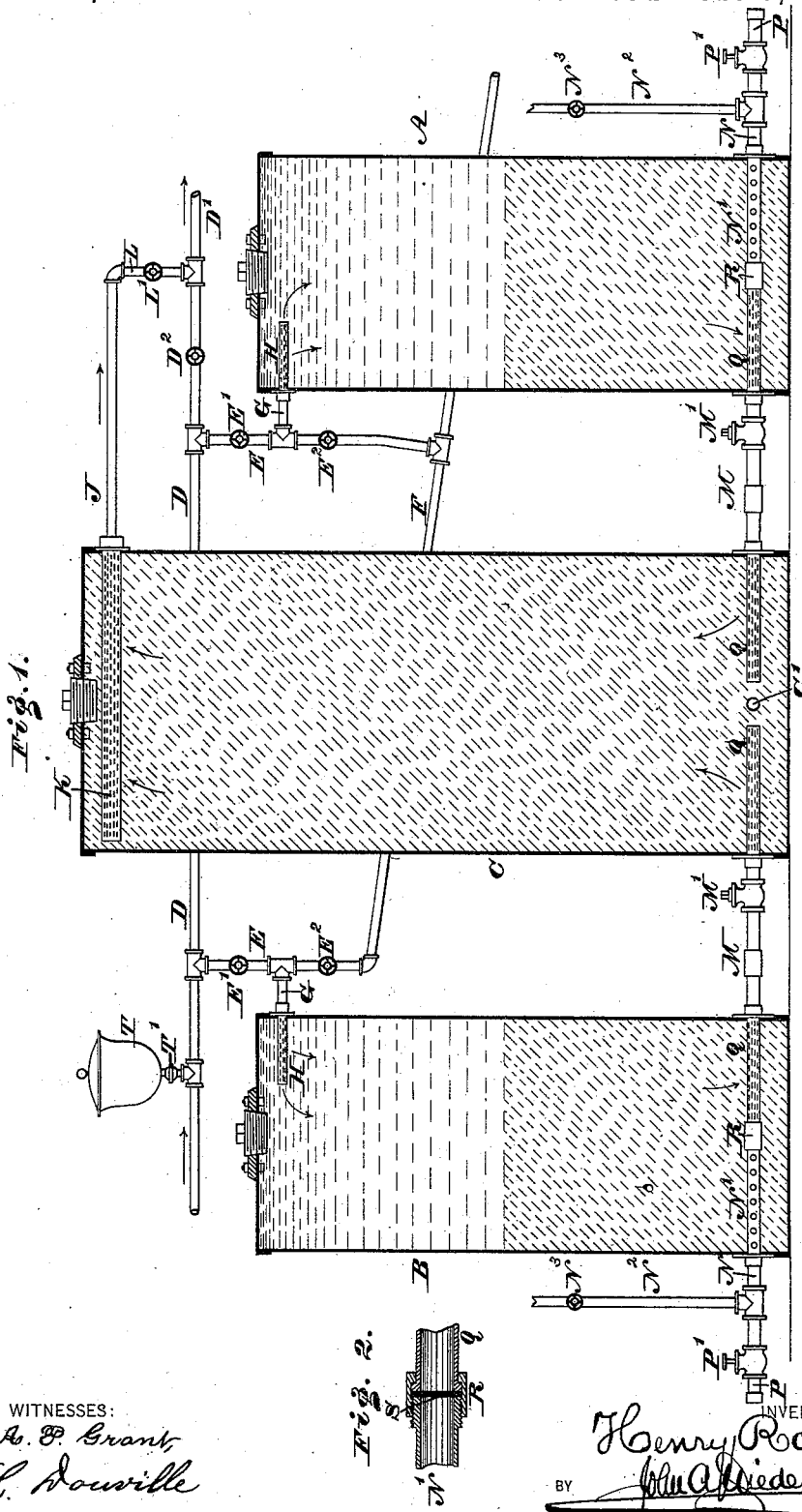
WITNESSES:
A. P. Grant
L. Douville
INVENTOR:
Henry Roeske
BY John A. Wiedersheim
ATTORNEY.

UNITED STATES PATENT OFFICE.

HENRY ROESKE, OF PHILADELPHIA, PENNSYLVANIA.

FILTER.

SPECIFICATION forming part of Letters Patent No. 357,505, dated February 8, 1887.

Application filed September 20, 1886. Serial No. 214,036. (No model.)

*To all whom it may concern:*

Be it known that I, HENRY ROESKE, a citizen of the United States, residing in the city and county of Philadelphia, State of Pennsylvania, have invented a new and useful Improvement in Filters, which improvement is fully set forth in the following specification and accompanying drawings, in which—

Figure 1 represents a vertical section of a filter embodying my invention. Fig. 2 represents a section of a detached portion thereof.

Similar letters of reference indicate corresponding parts in the two figures.

My invention consists of a filter having characteristics, as hereinafter set forth, whereby both filtered and unfiltered water may be drawn from the device, the water may be filtered and purified, the filter may be cleaned, and the filtering material removed when required.

Referring to the drawings, A B represent vessels containing filtering material—as coarse sand, ground rock, &c.—and C represents a vessel containing purifying material—as pulverized charcoal, &c.—said vessels being cylindrical, to which shape, however, I do not limit myself.

D represents the supply-pipe, which is provided with branches E, and F represents a waste-pipe, which is connected with the branches E. Connected with the branches E are pipes G, which lead into the cylinders A B, and have their inner ends perforated or provided with roses, as at H.

J represents a discharge-pipe, which leads from the interior of the cylinder C, where it is provided with a perforated end or rose, K, and is connected by means of a pipe, L, with the pipe D', which is a continuation of the supply-pipe D.

The cylinders A B are in communication with the cylinder C by means of pipes M, which lead from the interior of the cylinders A B to the interior of the cylinder C.

Pipes N lead from the cylinders A B and are connected with a pipe, P, which may be connected with a supply or a place of collection for filtering material, as will be hereinafter referred to. To said pipes N are attached steam-pipes $N^2$.

The inner ends of the pipes M are finely perforated or have roses Q, and the inner ends, N', of the pipes N are also perforated, the openings being larger than those of the pipes M. The rose or end K of the pipe J and roses or ends H of the pipes G are also finely perforated, the fine perforations of the several pipes admitting of the passage of water without allowing the filtering or purifying material to escape, while the large openings of the pipes N permit the escape of filtering material when so required.

The pipe D has a cock, $D^2$, between the pipe L and adjacent branch E. The branches E have cocks E' $E^2$.

The pipe L has a cock, L', and the pipes M have cocks M'. The pipes $N^2$ have cocks $N^3$, and the pipes P have cocks P'.

The pipes M N have their ends Q N', which are within the cylinders A B, connected by the couplings R, and a partition, S, is placed between said ends, whereby direct communication between the pipes M N is closed.

The operation is as follows: The cocks $D^2$ $E^2$ $N^3$ are closed, and water is admitted to the pipe D, and directed by the same to the branches E, and enters the cylinders A B, and descends through the filtering material to the pipes M, by which it is directed into the cylinder C, and ascends through the purifying material therein to the discharge-pipe J, by which it is directed through the pipe L to the pipe D', and thus conveyed to the place of service. By closing the cock L' and cock $E^2$ of one branch E and cock E' of the other branch the water will enter either of the branches E and one of the cylinders A B, and then flow through the pipes M and cylinder C into the other cylinder, A or B, and, rising in the latter, will escape through the relative pipe G and branch E into the waste-pipe F, the water in its passage through the cylinder A or B agitating the filtering material therein, and removing the collected impurities and refreshing the filtering material. Should it be desired to introduce steam into the cylinders, it is accomplished by means of the pipes $N^2$, which are connected with a steam-boiler. When it is desired to remove the filtering material from the cylinders A B, the cocks P' are opened and the pipes M' closed, and the water entering said cylinders escapes with the filtering material through the perforated ends N' of the pipes N, and is discharged through the pipe P. The purifying material in the cylinder C may be removed therefrom through the opening C' in the lower portion thereof, said opening, when the material is to be retained, being closed by a plug, cock, &c. When unfiltered water is required, the cocks E' E' are closed and the cock D² is opened, in which case the water flows through the pipes D D' without passing through the cylinders.

T represents a hopper or charger for containing salicylic acid or other antiseptic material, the same being connected with the inlet end of the pipe D, or with either of the vessels A B, and provided with a cock, T', whereby said acid or material may be admitted into the pipe, and thus reach the vessels A B, preventing decomposition within the filter, and keeping the vessels and the filtering material clean and sweet.

Having thus described my invention, what I claim as new, and desire to secure by Letters Patent, is—

1. A filtering-vessel having two outlet-pipes, the ends thereof within the vessel having perforations of different grades, one permitting the passage of water only, and the other of water and the filtering material, substantially as and for the purpose set forth.

2. A filtering apparatus having a vessel with filtering material, an inlet-pipe, an outlet-pipe provided with a cock, and having in its inner end a series of perforations of larger size than those of a series of perforations in the water-outlet pipe of said vessel, whereby the filtering material may be withdrawn, all substantially as described.

3. A filtering apparatus having two filtering-vessels and a purifying-vessel, a supply-pipe having branches communicating with the filtering-vessels, a waste-pipe connected to the said branches, pipes connecting said filtering-vessels with said purifying-vessel, a discharge-pipe with branch leading into a continuation of the supply-pipe, a cock in said discharge-pipe, a cock in said supply-pipe between the discharge-pipe and branches of the supply-pipe, and cocks in said branches, all of said parts combined and arranged substantially as and for the purpose set forth.

4. In a filtering apparatus, the supply-pipe D, having branches E, said pipe and branches being provided with cocks D², E', and E², the pipes G, filtering-vessels A B, vessel C, with purifying material therein, communicating pipes M, having cocks M', the discharge-pipe J, with branch L, having cocks L', and leading into the pipe D', the latter being a continuation of the supply-pipe D, and waste-pipe F, all of said parts so combined and arranged whereby the direct inflow of the water into either of the filtering-vessels may be stopped and the vessel filled by means of the pipe communicating with the purifying-vessel, substantially as and for the purpose set forth.

HENRY ROESKE.

Witnesses:
JOHN A. WIEDERSHEIM,
A. P. GRANT.